Oct. 28, 1924.

A. M. BRENNE

SHOCK ABSORBER

Filed Sept. 16, 1922

1,512,903

Witnesses
Wm. Geiger

Inventor
Arild M. Brenne
By Geo. J. Haight
His Atty.

Patented Oct. 28, 1924.

1,512,903

UNITED STATES PATENT OFFICE.

ARILD M. BRENNE, OF CHICAGO, ILLINOIS, ASSIGNOR, BY MESNE ASSIGNMENTS, TO W. H. MINER, INC., A CORPORATION OF DELAWARE.

SHOCK ABSORBER.

Application filed September 16, 1922. Serial No. 588,557.

*To all whom it may concern:*

Be it known that I, ARILD M. BRENNE, a citizen of the United States, residing at Chicago, in the county of Cook and State of Illinois, have invented a certain new and useful Improvement in Shock Absorbers, of which the following is a full, clear, concise, and exact description, reference being had to the accompanying drawings, forming a part of this specification.

This invention relates to improvements in shock absorbers.

One object of the invention is to provide a shock absorber especially adapted for automobiles which is efficient in operation, ruggedly constructed, and economical to manufacture, finish and assemble.

A more specific object of the invention is to provide a shock absorber of the character indicated in which the resistance to the shock is obtained by a combination of spring, liquid, and gas cushioning resistance.

Figure 1:
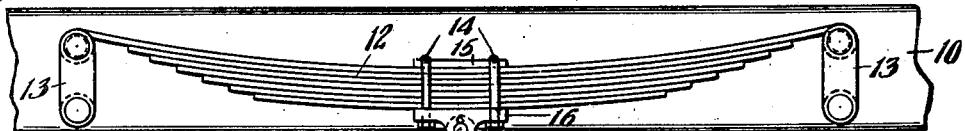
Figure 2:
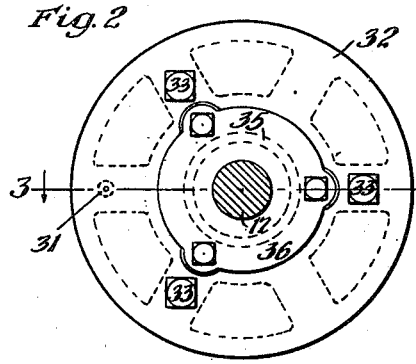
Figure 3:
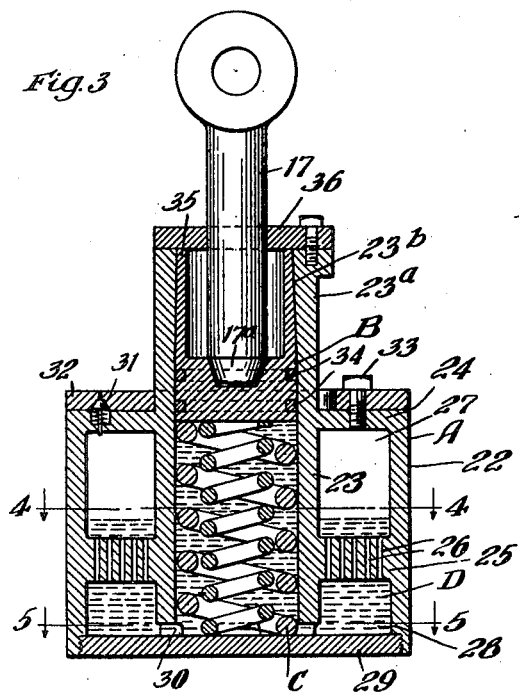
Figure 4:
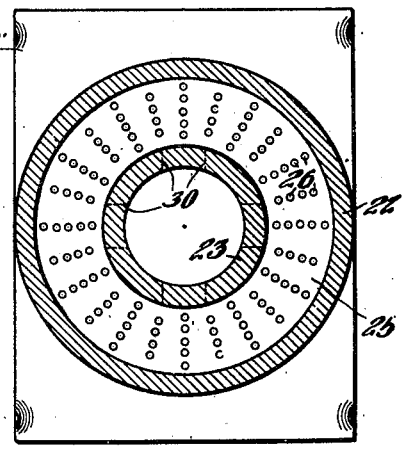
Figure 5:
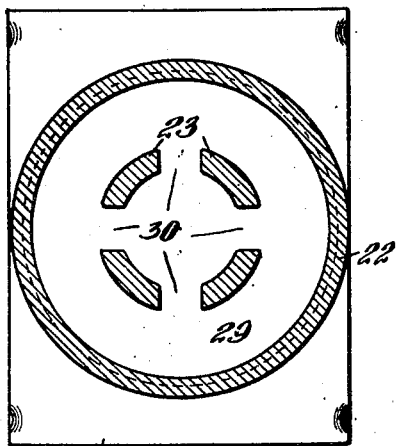

In the drawings forming a part of this specification, Figure 1 is an elevational view of a portion of an automobile chassis and axle, the latter being shown in section, illustrating my improvements in connection therewith. Figure 2 is a sectional view corresponding to the section line 2—2 of Figure 1. Figure 3 is a vertical sectional view of the shock absorber proper corresponding to the section line 3—3 of Figure 2. And Figures 4 and 5 are horizontal sectional views taken on the lines 4—4 and 5—5 of Figure 3.

In said drawing, 10 denotes one side frame of an automobile chassis, 11 the rear axle, 12 a semi-elliptical spring connected to the chassis by links 13—13.

The improved shock absorber is interposed between the spring 12 and the axle 11, as shown in Figure 1, said shock absorber being attached to the spring 12 by U-bolts 14—14 passing over a wear plate 15 and through a plate 16 which is pivotally connected to a stem or plunger 17, as indicated at 18. The attachment to the axle is made in a practically similar manner by the U-bolts 19—19 which pass over a plate 20 and through an anchor plate 21.

The improved shock absorber as shown, comprises preferably a cylindrical casting designated generally by the reference character A; a piston B; a spring C; and a quantity of liquid D.

The casting A is formed with a cylindrical vertically extending wall 22, and inner concentric cylindrical wall 23, and a top wall 24. The inner cylindrical wall 23 is extended above the top wall 24 as indicated at 23ª and the same forms a cylinder for the piston B. The casting A is formed with a relatively thick or heavy horizontally disposed partition 25 through which are extended a relatively large number of passages 26—26 of restricted area. From the preceding description, it will be seen that the casting A provides not only the cylinder for the piston B but an auxiliary chamber surrounding the cylinder, the auxiliary chamber in turn being divided into an upper compartment 27 and a lower compartment 28, by the horizontal partition 25, the latter being so located as to leave the capacity of the upper compartment 27 approximately twice that of the lower compartment 28. The bottom of the casting A is closed by the plate 29 threaded thereinto, said plate 29 constituting preferably a portion of the securing plate 20, heretofore referred to. The bottom edge of the wall 23 is radially notched as indicated at 30—30 so as to provide restricted passages between the cylinder and the auxiliary chamber exterior thereto.

In the top wall 24 of the casting A, is an air inlet spring-controlled check valve 31 mounted in a suitable recess provided in said wall 24 proper and an auxiliary detachable cover plate 32 which is held in place by a plurality of bolts 33.

The stem or plunger 17 is preferably tapered at its lower end as indicated at 17ª where it is arranged to fit within a corresponding socket provided in the piston B. The latter may have suitable piston rings or washers 34 as shown in Figure 3. Preferably also the piston B is formed with a skirt 35 slightly upwardly tapered, the upper portion of the cylinder being similarly tapered as indicated at 23ᵇ so that, as the piston approaches the upper limit of its stroke, it will fit snugly within the cylinder. The stem 17 is guided, in part, by a detachable plate 36 secured to the upper end of the cylinder extension 23ª.

The spring C is disposed within the cylinder beneath the piston B, as clearly shown in Figure 3, and oil or other suitable liquid D is used to fill the cylinder and the lower compartment of the auxiliary chamber and preferably partially fill the upper compartment of the auxiliary chamber.

The operation is as follows, assuming relative approach of the chassis and axle. As the plunger 17 comes down, forcing the piston B with it, it is yieldingly resisted by the spring C and also by the liquid D which is forced from within the cylinder through the openings 30 into the lower compartment 28 and from the latter up through the restricted openings 26 into the upper compartment 27. There will also be an air cushion formed within the compartment 27 as the liquid rises therein. Hence it will be seen that the shock is resisted in reality by three independent sources, namely, the spring, the friction due to the transferrence of the liquid from one place to another through restricted passages, and the air or gas cushion. Upon the recoil or return of the automobile parts to normal, the piston B will be restored by the spring C, the liquid being drawn into the cylinder, partly due to the vacuum which would otherwise be created behind the piston and partly due to the expansion of the trapped air within the compartment 27. A check valve 31 is provided to take care of any vacuum or pressure below atmosphere which may be created within the compartment 27.

All the metal parts obviously can be manufactured at comparatively small expense; their shape and size make them readily available for finishing machine operations; the structure is such that it will resist hard and severe usage; and the arrangement is unusually compact.

I have herein shown and described what I now consider the preferred manner of carrying out the invention, the same is merely illustrative and I contemplate all changes and modifications that come within the scope of the claims appended hereto.

I claim:

1. In a shock absorber, the combination with a cylinder tapered at one end; of a piston tapered at one end so as to snugly coact with the tapered portion of the cylinder wall at the end of movement of the piston in one direction; a spring resisting movement of the piston inwardly of the cylinder; an auxiliary chamber having communication with the cylinder by means of restricted passages; and fluid means transferable between the cylinder and said auxiliary chamber through said restricted passages.

2. In a shock absorber, the combination with a member having an outer wall and a cylindrical wall disposed therewithin and spaced from the outer wall, the cylindrical inner wall providing a cylinder; of a piston within said cylinder; means providing communication from the cylinder to the space between the cylinder wall and the outer wall; and a horizontally disposed partition extending between the outer wall and said cylindrical wall above said last named means, said partition being provided with openings therethrough of restricted area to provide communication between the spaces on opposite sides of the partition.

3. In a shock absorber, the combination with a member having inner and outer concentric walls united by spaced transversely extending walls, one of the latter having openings of restricted area extending therethrough and thereby providing communication between the compartment formed on opposite sides thereof; a detachable closure for the ends of said concentric walls; a piston slidable within the inner of said walls; a spring interposed between said piston and the removable closure plate; and means below said transversely extending wall for providing communication from the bottom of the cylinder to one of said compartments.

In witness that I claim the foregoing I have hereunto subscribed my name this 18th day of August, 1922.

ARILD M. BRENNE.

Witnesses:
UNA C. GRIGSBY,
ANN BAKER.